United States Patent [19]

Giles

[11] Patent Number: 4,739,952

[45] Date of Patent: Apr. 26, 1988

[54] INTEGRAL COOLING SYSTEM FOR HIGH-TEMPERATURE MISSILE STRUCTURES

[75] Inventor: Daniel N. Giles, Seattle, Wash.

[73] Assignee: The United States of America as represented by the Secretary of the Army, Washington, D.C.

[21] Appl. No.: 892,619

[22] Filed: Aug. 4, 1986

[51] Int. Cl.[4] ................................................ B64C 1/00
[52] U.S. Cl. ............................ 244/117 A; 244/158 A
[58] Field of Search .......... 244/158 A, 117 A, 158 R, 244/121, 3.24, 160

[56] References Cited

U.S. PATENT DOCUMENTS

| | | | |
|---|---|---|---|
| 3,067,594 | 12/1962 | Bland et al. | 244/117 A |
| 3,138,009 | 6/1964 | McCreight | 244/117 A |
| 3,255,698 | 6/1966 | Lindberg, Jr. | 244/158 A |
| 3,267,857 | 8/1966 | Lindberg, Jr. | 244/158 A |
| 3,682,100 | 8/1972 | Lindberg, Jr. | 244/158 A |
| 3,883,096 | 5/1975 | Osofsky | 244/117 A |
| 4,041,872 | 8/1977 | McConn et al. | 244/158 A |
| 4,073,985 | 2/1975 | San Miguel | 244/158 A |
| 4,098,194 | 7/1978 | Miller et al. | 244/158 A |
| 4,482,111 | 11/1984 | LeTouche | 244/158 A |
| 4,592,950 | 6/1986 | LeTouche | 244/158 A |

OTHER PUBLICATIONS

Paul D. Sones et al., "A Study Advanced Thermal Protection Systems", AIAA/ASME 9th Structures, Structural Dynamics and Materials Conference, Apr. 1–3, 1968, pp 1–10.

W. D. Allingham, "Vapor-Cooled Insulation for Thermal Protection of Hypersonic Glide Vehicles", ARS Journal, June 1962, pp 945–948.

Primary Examiner—Joseph F. Peters, Jr.
Assistant Examiner—L. M. Fiorito
Attorney, Agent, or Firm—John C. Garvin, Jr.; Freddie M. Bush

[57] ABSTRACT

An integral cooling system for high temperature missile structures which is essentially a passive cooling system integrated into the missile structure. An evaporative material carried in the missile structure is ejected by vapor pressure through openings in the missile's outer skin and cools the missile as it flows along the outer surface thereof.

2 Claims, 1 Drawing Sheet

INTEGRAL COOLING SYSTEM FOR HIGH-TEMPERATURE MISSILE STRUCTURES

DEDICATORY CLAUSE

The invention described herein was made in the course of or under a contract or subcontract thereunder with the Government and may be manufactured, used, and licensed by or for the Government for governmental purposes without the payment to me of any royalties thereon.

BACKGROUND OF THE INVENTION

Hypersonic missiles operate in an extremely severe thermal environment, with skin temperatures reaching 6000° F. There are no practical insulative materials, much less structural materials, that can survive these temperatures, particularly when combined with aerodynamic erosion. Structure must be protected either with ablative insulation or be cooled.

Certain missile guidance systems utilizing radar or optical sensors require a viewing port or window of some optically or radar transparent material. Ablation products from ablative insulators tend to obscure the sensor's view, and so, such insulators cannot be used ahead of or in the vicinity of such windows. Structure ahead of the window must therefore be cooled. The standard cooling method is to inject a gas under pressure into the flow ahead of the window (film cooling) or to pump it through holes distributed over the skin (transpiration cooling). Both systems require a very large rate of gas flow, a considerable quantity of gas under high pressure, a manifold, and a cooling control system. There are large cost, weight, reliability, and volume penalties associated with these systems.

SUMMARY OF THE INVENTION

A passive cooling system for hypersonic missiles which is integrated into the missile structure which is composed of a truss-core or honeycomb sandwich, such as titanium face skins with brazed aluminum core. This is a very efficient structure for many missile applications. The core is filled with a suitable material which is injected in a liquid state, and which may or may not be solid at room temperature. The outer skin is also the aero surface, and is perforated with many small holes. The holes are plugged at room temperature with a material that vaporizes as the temperature of the skin rises and cooling becomes necessary. The increasing temperature of the outer skin vaporizes the material filling the core, which is ejected by vapor pressure out of the holes. Cooling is accomplished by the change of state of the evaporating material and by the film created as it is ejected into the air stream.

DESCRIPTION OF THE PREFERRED EMBODIMENT

Figure 1:
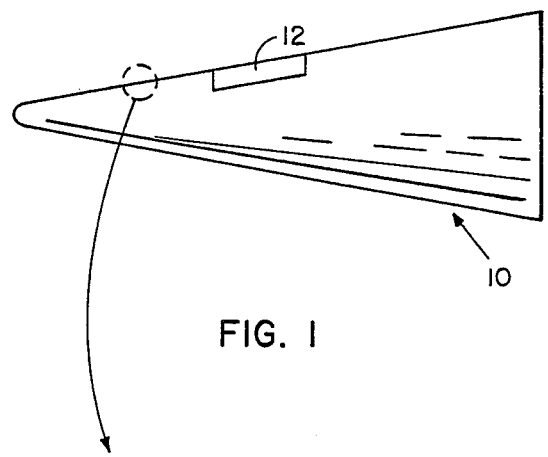
FIG. 1 is an elevational diagrammatic view of a hypersonic missile having a window on the surface therof.

As seen in FIG. 1, a hypersonic vehicle 10 includes a window or viewing port 12 disposed therein. The window is comprised of optically or radar transparent material.

Figure 2:
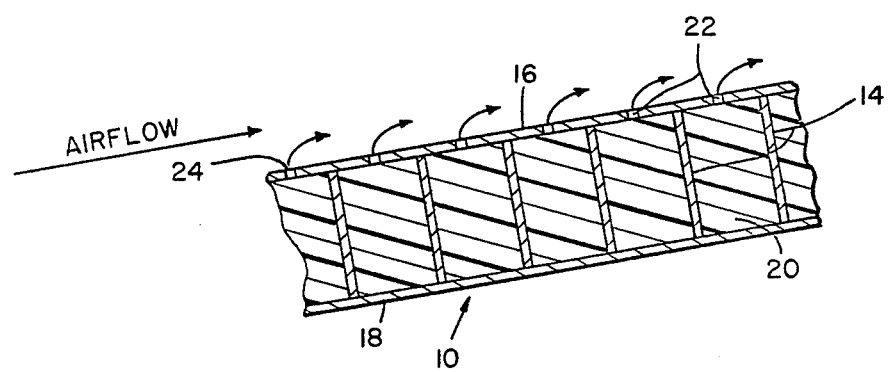
FIG. 2 is a sectional view taken along line 2—2 of FIG. 1.

As seen in FIG. 2, the missile 10 is comprised of a truss-core 14 having inner and outer skins 16 and 18. The structure may be made of titanium face skins with brazed aluminum core. The core is filled with a suitable evaporative material 20 which is injected in a liquid state and which may or may not be solid at room temperature. The outer skin 16 is also the aerodynamic surface and is perforated with many small holes 22. The holes 22 are plugged by a plug material 24 (only one shown). The material 24 vaporizes as the temperature of the skin rises and cooling becomes necessary. When increasing temperature of the outer skin vaporizes the plug material 24, the plug material is ejected out of the holes 22 by vapor pressure from the evaporative material 20. Cooling is accomplished by effusion caused by the change of state of the evaporating material and by the film created as it is ejected into the air stream.

Some advantages of this system are (1) no pressure vessel, manifold, or control system is required; (2) the cooling material is contained within a volume that is otherwise wasted; (3) the cooling material is in its most compact form (liquid or solid as compared to gas); and (4) lends itself to metallic structure, which is efficient when cooled and has cost advantages over composite structure.

The material must be transparent while in a gaseous state to the sensor employed; and it should be nonreactive or at least endothermically reactive, with reaction products that are compatible with the structure and the sensor's requirements. A number of materials are suitable for this application, notably, camphor or naptha or any number of a family of waxes chemically tailored to have the thermodynamic properties and radar transparency as required.

This system may also have advantages over ablative-type systems for missiles that do not have optical or radar sensing requirements, but need to minimize surface temperatures for purposes of reducing the IR signature.

I claim:

1. An integral passive cooling system for high-temperature missiles having inner and outer skins and a truss-core structure dispersed there between and in secured relation therewith, comprising: An evaporative material carried by said missile in said truss-core structure; said outer skin having a plurality of openings therethrough in communication with the atmosphere and said evaporative material for ejecting under pressure said evaporative material therethrough for flow along said outer skin responsive to said missile temperature increasing to a predetermined level, said level being the temperature at which said evaporative material vaporizes thereby producing said pressure; a plug disposed in each of said openings, said plug comprising of an evaporative material and being disposed for vaporization responsive to said temperature reaching said predetermined level; said inner and outer skins being titanium and said core structure being aluminum, said aluminum being brazed to said skins.

2. A system as in claim 1 wherein said missile includes a window of optically or radar transparent material.

* * * * *